Aug. 14, 1923.
L. W. NOBLES
1,465,245
COMBINED PARKING BUMPER AND THEFT INDICATOR
Filed Nov. 15, 1922    2 Sheets-Sheet 1
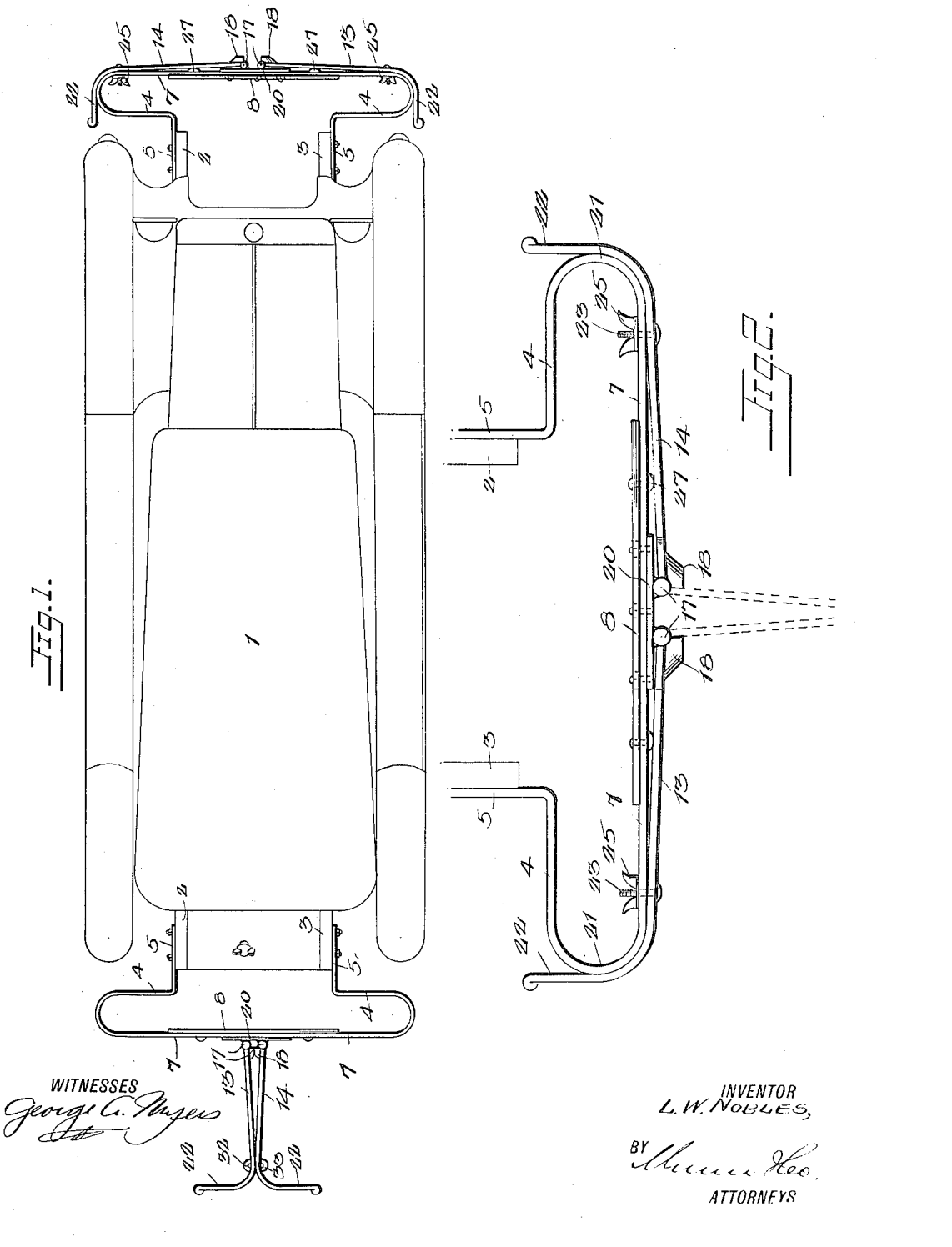
WITNESSES
George C. Myers
INVENTOR
L. W. NOBLES,
BY
ATTORNEYS Aug. 14, 1923.

L. W. NOBLES

COMBINED PARKING BUMPER AND THEFT INDICATOR

Filed Nov. 15, 1922    2 Sheets-Sheet 2

1,465,245

WITNESSES

INVENTOR
L. W. NOBLES,
BY
ATTORNEYS

Patented Aug. 14, 1923.

1,465,245

UNITED STATES PATENT OFFICE.

LEMUEL WILLIAM NOBLES, OF WASHINGTON, DISTRICT OF COLUMBIA.

COMBINED PARKING BUMPER AND THEFT INDICATOR.

Application filed November 15, 1922. Serial No. 601,137.

*To all whom it may concern:*

Be it known that I, LEMUEL WILLIAM NOBLES, a citizen of the United States, and a resident of Washington, in the District of Columbia, have invented certain new and useful Improvements in Combined Parking Bumpers and Theft Indicators, of which the following is a specification.

This invention relates to bumpers and is more particularly directed to a bumper for parking purposes.

An object of the invention is the provision of an auxiliary bumper to be employed in connection with the main bumper for preventing drivers from parking their cars too close to a car equipped with the auxiliary bumper.

Another object of the invention is the provision of a bumper which may be so arranged and predeterminedly positioned in projected relation from the front and rear of a car when said car is parked along a curbing that the drivers of other cars may not encroach upon the space either in front or to the rear of the car which is usually allotted to a parked car; the bumper also serving as a theft indicator when the car is driven with the bumper arranged and locked in projected relation from the opposite ends of said car.

Other objects and advantages will become apparent during the course of the following description.

The invention is illustrated by way of example in the acompanying drawings, in which, Figure 1 is a plan view of an automobile with my improved parking bumper shown connected to the rear and front of an automobile.

Figure 2 is a top plan view of the parking bumper shown in an inoperative position with the main bumper of an automobile.

Figure 3:
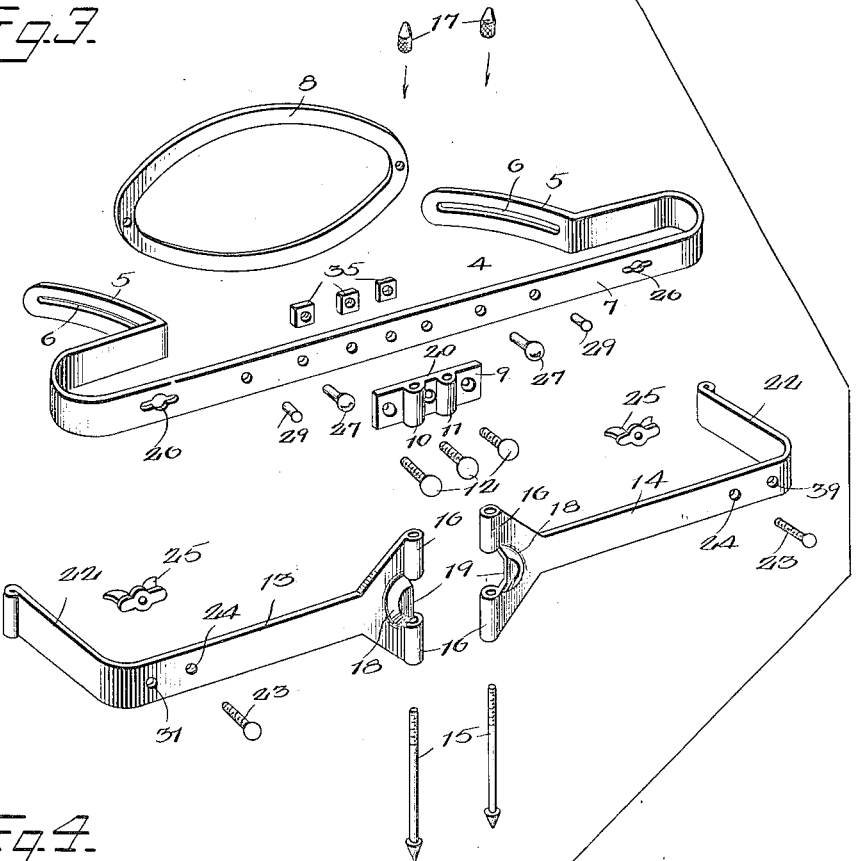
Figure 3 is a view in perspective of the parking bumper separated from the main bumper and disclosing details of its connections.
Figure 4:
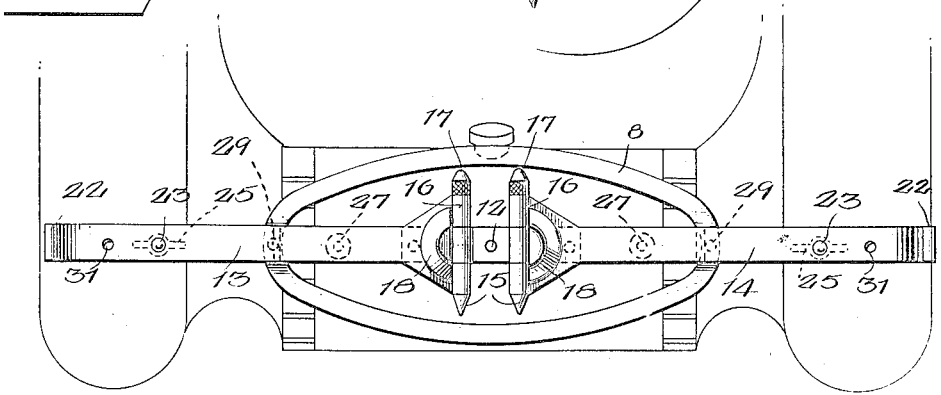
Figure 4 is a front view of the parking bumper combined with the main bumper.

Referring to the drawings, 1 indicates an automobile, 2 and 3 the longitudinal side members of the frame which extend beyond the rear and front ends of the automobile. To the outwardly extending ends of the members 2 and 3 are connected the inner bent ends of the U-shaped main bumper 4.

The main bumper 4 has its inner ends 5 slotted as shown at 6 whereby the bumper may be adjusted toward or away from the front or rear of the automobile. The main bumper 4 is provided with a transverse bar 7 upon the rear of which is secured by means of rivets the elliptical member 8.

Secured to the front face of the bar 7 is a block 9 having the journals 10 and 11. The block 9 is provided with perforations through which are adapted to be inserted the threaded bolts 12 whereby the block is locked to the front face of the member 7. A pair of leaves 13 and 14 are pivotally connected to the block 9. For this purpose I insert a pin 15 through the spaced apart journals 16 on the inner end of the leaf 13 which pin is likewise inserted through the journal 10 on the block 9 with the journals 16 of the leaf 13 embracing the journal 10.

A cap nut 17 is screwed upon the upper threaded end of the pin 15 for locking the pin in position. The leaf 14 on its inner end is likewise provided with a pair of spaced journals 16 adapted to embrace the journal 11 on the block 9 and be held in position on the block by means of the pin 15 passing through the journals 16 and the journal 11. A similar cap nut 17 locks the pin in position. A portion of the middle of the leaves 13 and 14 between the journal 16 and slightly to the rear of the same is punched outwardly to form a cupped member 18. The inner edge 19 of said cup-shaped member is adapted to engage the intermediate portion 20 of the block 9 when the leaves are moved to the position at the rear of the automobile as illustrated in Figure 1.

The outer ends of the leaves 13 and 14 are bent inwardly at right angles to the plane of the body of the leaves and curved to conform to the curvature of the opposite ends 21 of the main bumper 7 with the free ends 22 of the leaves projecting rearwardly towards either the front or the rear wheels of the automobile.

A threaded bolt 23 is adapted to be passed through a perforation 24 adjacent the outer ends of the leaves and to receive a winged nut 25 for locking the leaves 13 and 14 into rigid engagement with the bar 7 of the bumper 4. The bar 7 of the main bumper is provided with passages 26 in alinement with the nuts 25 on the ends of the bolts 23 and through which passages the nuts are inserted when the leaves are located in face to face engagement with the bar 7. These nuts are turned until the leaves are drawn up tight against the bar 7 of the bumper 4 and the nuts are positioned transversely of the slots 26 to prevent the disengagement of the leaves from the main bumper.

Split washers may be placed upon the bolts 23 to prevent slipping of the nuts 25 through the passages 26 when said nuts are being turned.

Adjacent the hinged portions of the leaves 13 and 14 I have mounted rivets 27 with rounded heads projecting outwardly from the face of the bars 7 of the bumper 4 to engage the leaves 13 and 14 and prevent rattling of said leaves when the wing nuts 25 are screwed up tight on the threaded bolts 23.

The rivets 29 provide means for securing the elliptical member 8 to the main bumper 4. Nuts 35 which are screwed on the threaded bolts 12 lock the journal block 9 to the bar 7 of the bumper 4.

Adjacent the ends of the leaves 13 and 14 and at a point on the leaves just before they begin to curve around the ends 21 of the main bumper 4 I have provided passages 31 which are adapted to aline with each other when the leaves are placed in longitudinal alinement as shown at the rear of the automobile in Figure 1. A shackle 32 of the lock 33 is passed through these alined perforations whereby the two leaves are locked together when the members 22 of said leaves will be located in a horizontal position and in substantial alinement with each other for acting as a spacing bumper when an automobile to which the bumpers have been applied is parked along the curbing of a street.

It is the law in most jurisdictions in parking most automobiles that an automobile should be spaced a certain number of feet from the preceding automobile, but the law is never enforced and therefore it frequently happens that automobiles are so crowded along a curbing that it is impossible for an owner of an automobile to remove the same after a number of machines have been parked along the same curbing. It will be only necessary in my parking bumper to release the leaves 13 and 14 by loosening the nuts 25 or turning them to a position where they will aline with the slots 26 whereby the leaves may be moved outwardly and alined as shown in Figure 1. The shackle 32 of the lock may be inserted through the passages 31 of the leaves and the shackle snapped in locking position with the lock body. As the leaves 13 and 14 are thus locked in position the edges 19 of the cup shaped members 18 will bear against the block 9 with the leaves 13 and 14 having a slight oscillating movement to the rear or front of an automobile. Nevertheless the lock 33 together with the members 19 will tend to maintain the locked leaves in a substantially longitudinal position or extended along the longitudinal center line of an automobile. These auxiliary bumpers will prevent another machine from moving up too close to the automobile and will cooperate with the main bumper for preventing injury to the automobile.

If at any time an unauthorized person should attempt to move the machine without first unlocking the leaves 13 and 14 and drive the machine along the street, the extended auxiliary bumpers will be sufficient to attract the attention of a policeman. In the first place in certain jurisdictions it is illegal to drive a vehicle with any projection extending from the rear or front of the machine the projections being considered dangerous to traffic and if the person who is driving the machine be an unauthorized person the conspicuousness of the machine through the auxiliary bumper will lead to his arrest and the recovery of the automobile.

The parking bumper it will be seen not only acts to command the proper spacing of automobiles when parked along a curbing and to aid in preventing injury to the automobile, but it acts as a theft indicator when the automobile is operated by an unauthorized person with the parking bumper projected from the automobile.

The conspicuous position of the lock connecting the free ends of the leaves together would discourage unauthorized persons from attempting to remove the lock by any other means than by a key.

When a number of cars are parked along a curbing of a congested street and equipped with the parking bumpers no space will remain between the cars to permit a person to pass between the cars in the middle of a block. Therefore pedestrians will be required to cross only at the intersection of the streets and stop the dangerous habit of crossing streets midway of a block.

What I claim is:

1. In a safety device for automobiles, a main bumper comprising a flat bar located in a vertical plane and extended transversely in spaced relation with the rear or front of an automobile, legs resiliently connecting the ends of the bar to a fixed part of the automobile, a plate rigidly secured centrally of and to the outer face of the transverse bar and provided with journals, swinging leaves provided with spaced journals at their inner ends adapted to vertically aline with a journal on the plate, a hinged pin insertable through the alined journals, said leaves adapted to lie in face to face engagement with the bar and having right angular extensions embracing the ends of said bar, means for rigidly and removably securing the swinging leaves to the bar, said leaves adapted to be swung at substantially right angles to the bar, and means for locking the leaves in extended relation outwardly from the bar with the right angular ends of said leaves in alinement and projecting in opposite directions from the connected leaves.

2. In a safety device for automobiles, a main bumper secured to a fixed part of an automobile and having a flat bar located in a vertical plane and extended transversely and in spaced relation to the rear or front of the automobile, leaves having their inner ends pivotally mounted on the outer face of said bar and swingable towards or away from said bar, means for locking the leaves in face to face engagement with the bar, and means for locking the outer ends of the leaves together when said leaves are projected outwardly from the bar.

3. In a safety device for automobiles, a main bumper having a bar spaced from an end of the automobile, leaves hingedly connected at their inner ends to said bar and provided with right angular extensions at their outer free ends, means for locking the leaves to the bar of the main bumper, said leaves adapted to be extended centrally and outwardly from the main bar, and means for locking the outer free ends of the leaves together, said right angular extensions of the leaves lying in the same vertical plane and projecting laterally from the leaves.

4. In a safety device for automobiles comprising a bar spaced from an end of the automobile and rigidly connected to a fixed part of the automobile, means pivoted on the bar adapted to be locked to the bar and swingable outwardly from the bar and adapted to be projected in extended relation outwardly from said bar, and means for locking the pivoted means in its extended position.

5. The combination of a bumper for automobiles, and means adapted to be temporarily locked in projected outward relation from the bumper.

6. The combination of a bumper, and means swingably mounted on the bumper and adapted to be locked in projected relation from said bumper.

7. In a safety device for automobiles, a pair of leaves swingably mounted in spaced relation to a fixed part of the automobile, means for locking the leaves in horizontal alinement and spaced transversely from a fixed part of the automobile, and means for locking the leaves together when said leaves are extended outwardly and longitudinally of the automobile.

8. A parking bumper comprising a plate adapted to be secured to a fixed part of an automobile, leaves hingedly mounted on the plate and adapted to be locked in a fixed position when laterally extended from the plate, and means for locking the leaves together when projected outwardly from the plate.

9. In a safety device for automobiles, a main bumper secured to a fixed part of an automobile and having a flat bar located in a vertical plane and extended transversely and in spaced relation to the rear or front of the automobile, leaves having their inner ends pivotally mounted on the outer face of said bar and swingable towards or away from said bar, means for locking the leaves in face to face engagement with the bar, means for locking the outer ends of the leaves together when said leaves are projected outwardly from the bar, and means secured to the bar upon opposite sides of the hinged connection of the leaves and engageable with the leaves when said leaves are locked in face to face engagement with the bar to prevent rattling of the leaves.

10. A combined theft indicating and parking bumper for automobiles comprising a bar spaced from the end of an automobile and rigidly connected to a fixed part of the automobile, means mounted on the bar and adapted to be locked in extended relation outwardly from said bar, and means for locking said last mentioned means when extended, against unauthorized manipulation.

LEMUEL WILLIAM NOBLES.